(12) United States Patent
Uchiyama (10) Patent No.: US 7,549,676 B2
(45) Date of Patent: Jun. 23, 2009

(54) ALL TERRAIN VEHICLE

(75) Inventor: Masayuki Uchiyama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 314 days.

(21) Appl. No.: 11/142,711

(22) Filed: Jun. 1, 2005

(65) Prior Publication Data
US 2006/0273546 A1 Dec. 7, 2006

(51) Int. Cl.
*B62D 25/00* (2006.01)
(52) U.S. Cl. .................. 280/847; 180/89.1; 180/313; 180/291; 362/476
(58) Field of Classification Search ............... 180/89.1, 180/313, 291; 280/847–849; 296/37.1, 198; 362/476, 506, 507
See application file for complete search history.

(56) References Cited

U.S. PATENT DOCUMENTS

| 4,356,536 | A | * | 10/1982 | Funabashi et al. ........... 362/476 |
| 4,636,922 | A | * | 1/1987 | Takimoto et al. ............ 362/476 |
| 6,497,506 | B1 | * | 12/2002 | Kakizoe ..................... 362/544 |
| 6,547,426 | B1 | * | 4/2003 | Ebara ........................ 362/473 |
| 6,997,586 | B2 | * | 2/2006 | Lee ............................ 362/507 |
| 7,134,702 | B2 | * | 11/2006 | Takahashi et al. .......... 296/37.1 |
| 7,231,996 | B2 | * | 6/2007 | Karube et al. ............ 180/69.24 |

FOREIGN PATENT DOCUMENTS

| JP | 03082685 A | * | 4/1991 |
| JP | 3466988 B | | 8/2003 |

* cited by examiner

*Primary Examiner*—Christopher P Ellis
*Assistant Examiner*—Katy Meyer
(74) *Attorney, Agent, or Firm*—Keating & Bennett, LLP (57) ABSTRACT

An all terrain vehicle is constructed to allow the positions at which the headlights are attached to be designed freely, and allows a large amount of design freedom in the vicinity of each headlight. Left and right brackets are detachably mounted to the body frame so as to be below the left and right front fenders, respectively, and the left and right headlights are mounted to the left and right brackets, respectively.

8 Claims, 9 Drawing Sheets

ALL TERRAIN VEHICLE

BACKGROUND OF THE INVENTION

1. Field of the Invention

The present invention relates to an all terrain vehicle, and more particularly to a headlight attachment structure.

2. Description of the Background Art

As a headlight attachment structure for an all terrain vehicle, there is a conventionally known a structure in which a first attachment section to be supported by a front fender and a second attachment section to be supported by a front guard are provided on a lamp case having a headlamp mounted therein, for example (see e.g. Japanese Patent No. 3466988).

Since the all terrain vehicle which is described in Japanese Patent No. 3466988 adopts a structure in which each lamp case having a headlamp mounted therein is supported by both a front fender and a front guard, the position at which the headlamp is attached is restricted by the shapes and positions of the front fender and the front guard, thus reducing design freedom. Moreover, each lamp case must have a complicated shape so as to cover the rear of the headlamp. Furthermore, each lamp case must be designed so as to conform to the headlamp shape in order to cover the rear of the headlamp, thus reducing the freedom in designing the shape of the lamp case.

SUMMARY OF THE INVENTION

In order to overcome the problems described above, preferred embodiments of the present invention provide an all terrain vehicle which allows the positions at which headlights are attached to be designed freely, and allows great freedom in designing the vicinity of each headlight.

According to a preferred embodiment of the present invention, an all terrain vehicle includes right and left front wheels respectively disposed on the right and left front sides of a body frame, right and left front fenders respectively disposed above the right and left front wheels, and right and left headlights respectively disposed in front of the right and left front fenders, wherein, right and left brackets are detachably mounted to the body frame below the right and left front fenders, respectively, and the right and left headlights are mounted to the right and left brackets, respectively.

In accordance with the all terrain vehicle of the present preferred embodiment, brackets which are separate parts from the body frame are detachably mounted to the body frame, with headlights being mounted to the brackets. As a result, by appropriately selecting the shapes of the brackets, it becomes possible to deploy the headlights in arbitrary positions, thus increasing the design freedom around each headlight.

These and other elements, features, aspects, characteristics and advantages of the present invention will be further described in the following detailed description of preferred embodiments of the present invention in conjunction with the accompanying drawings.

DETAILED DESCRIPTION OF PREFERRED EMBODIMENTS

Hereinafter, a preferred embodiment of the present invention will be described with reference to the accompanying figures.

FIGS. 1 to 9 are illustrations of an all terrain vehicle according to a preferred embodiment of the present invention. In the present preferred embodiment, any reference to a direction or side such as "front", "before", "rear", "behind", "right", or "left" indicates such a direction or side as viewed by a rider who is seated on a seat of the vehicle.

Throughout the figures, reference numeral 1 denotes an all terrain vehicle, which is generally structured as follows. At the front end of a double-cradle-type body frame 2, right and left front wheels 3 are supported at the right and left sides, so as to be capable of moving up and down, respectively via right and left front wheel suspension devices 4. Each of the right and left front wheels 3 preferably has a low-pressure and wide balloon tire attached thereon. At the rear end of the body frame 2, right and left rear wheels 5, which are similar to the front wheels 3, are supported via a rear wheel suspension device 6 so as to be capable of moving up and down. In a cradle of the body frame 2, an engine unit 7 is mounted. A fuel tank 8 is mounted above the engine unit 7. At the front of the fuel tank 8, a steering rod 9 with which to steer the right and left front wheels 3 is mounted so as to be capable of pivoting right or left. Steering handles 10 are affixed to an upper end of the steering rod 9. Behind the fuel tank 8 is mounted a seat 11. Furthermore, a front cover 12 is arranged so as to cover the steering rod 9 at the front. The right and left sides of the fuel tank 8 and the lower right and left sides of the seat 11 are covered by a side cover 13. Furthermore, right and left front fenders 14a, 14b are mounted respectively above the right and left front wheels 3, and right and left rear fenders 15 are mounted respectively above the right and left rear wheels 5.

Figure 1:
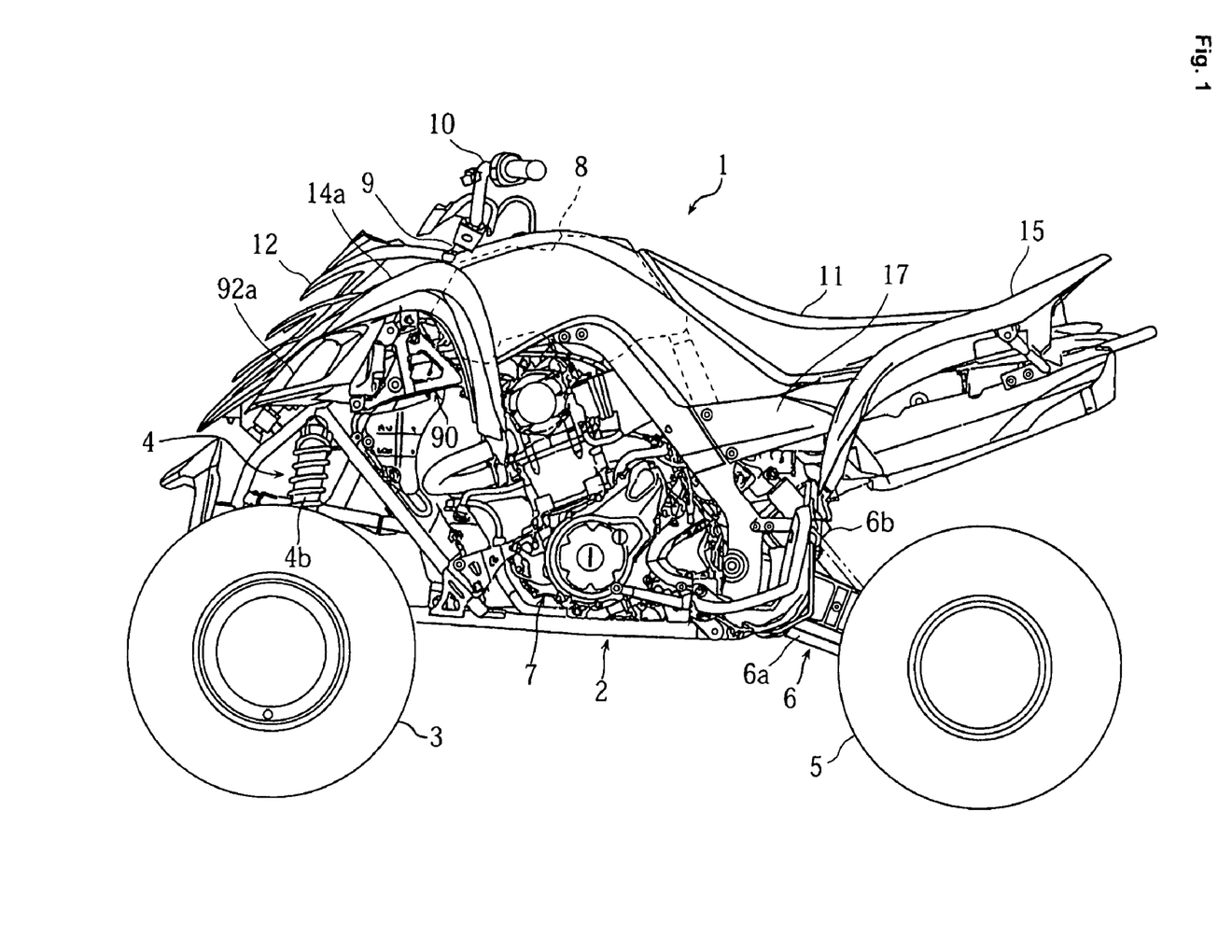
FIG. 1 is a side view of an all terrain vehicle for illustrating a preferred embodiment of the present invention.
Figure 2:
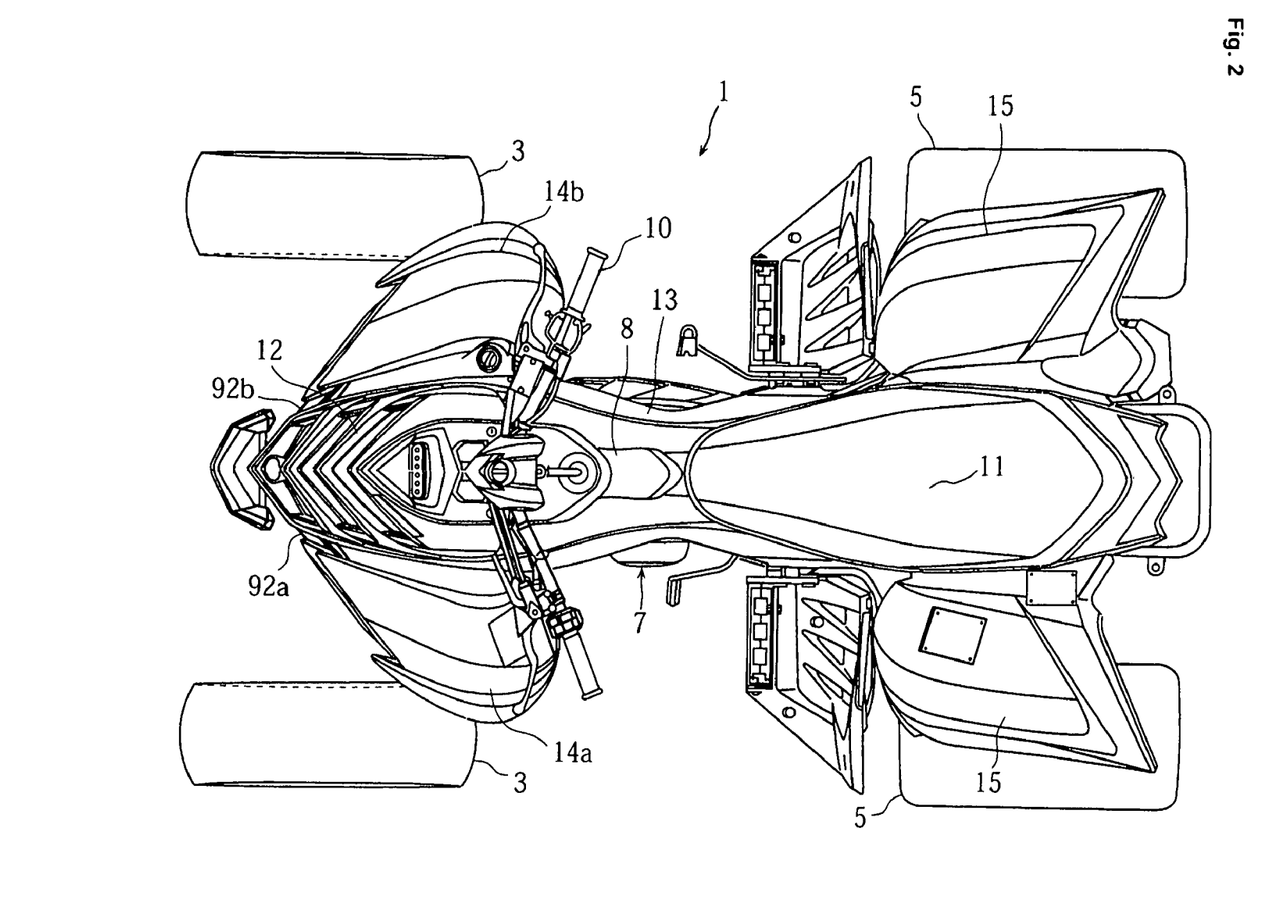
FIG. 2 is an upper plan view of the all terrain vehicle shown in FIG. 1.
Figure 3:
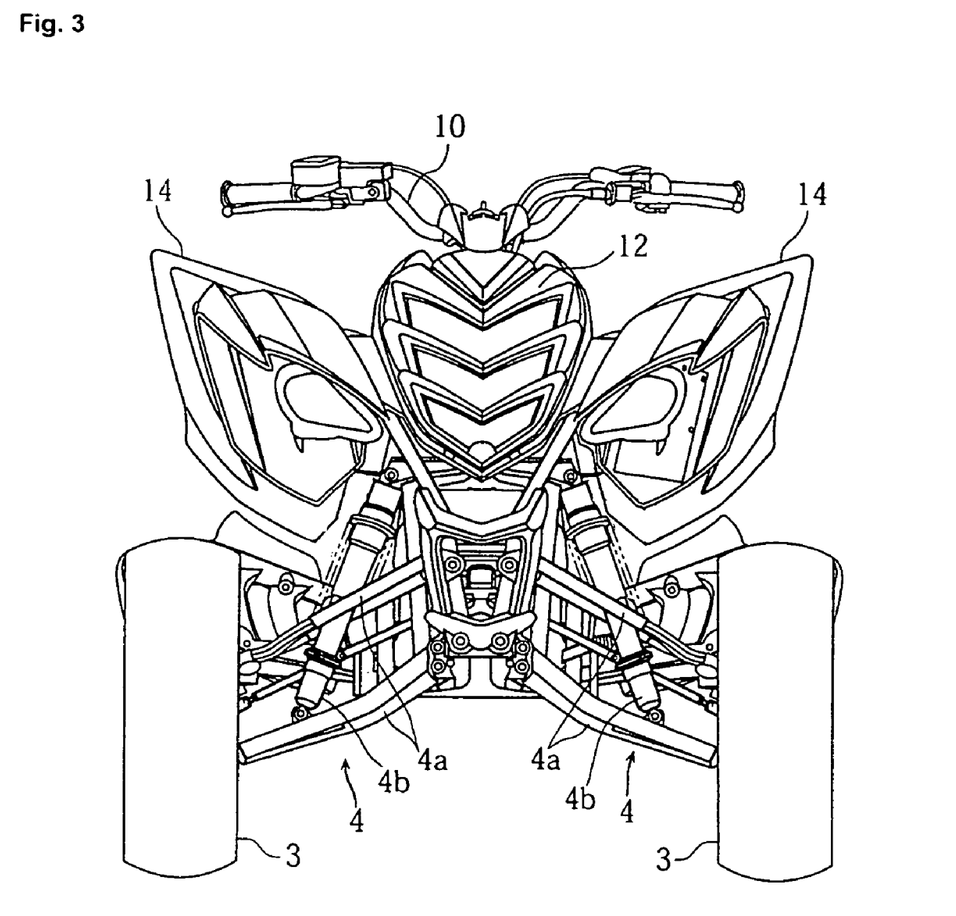
FIG. 3 is a front elevational view of the all terrain vehicle shown in FIG. 1.
Figure 4:
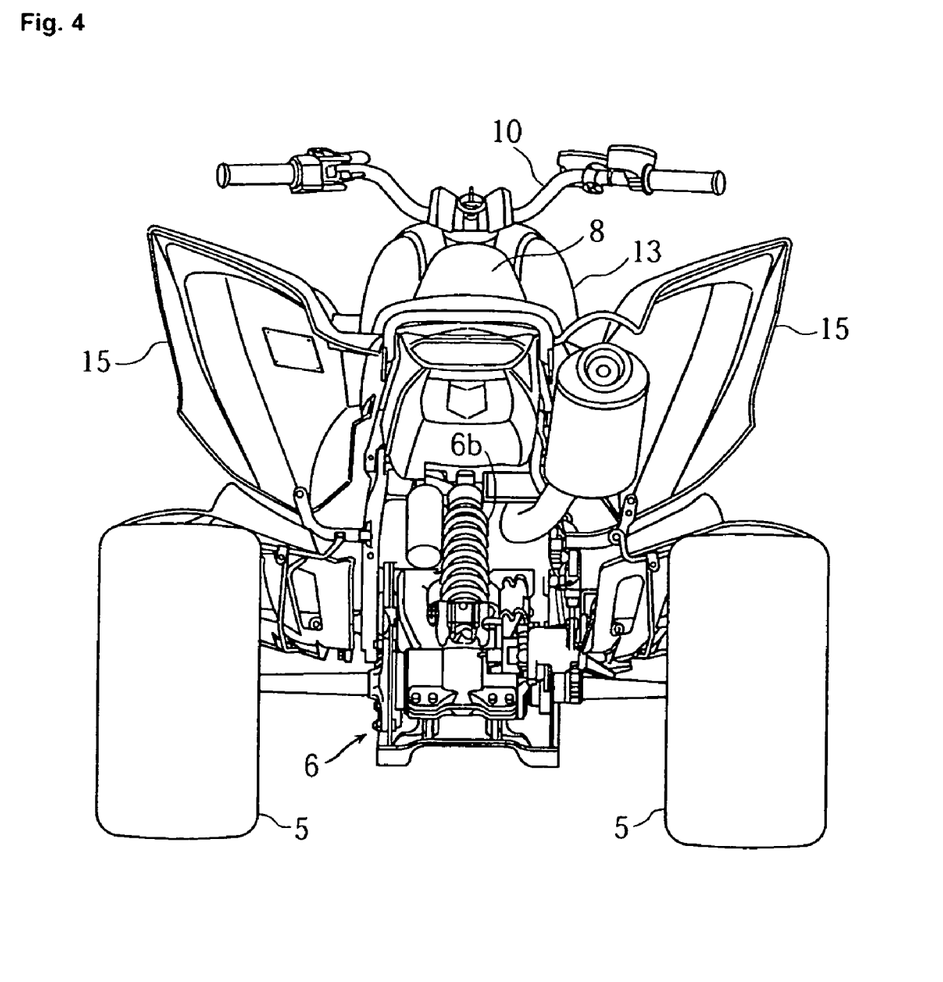
FIG. 4 is a rear view of the all terrain vehicle shown in FIG. 1.

Each front wheel suspension device 4 supports each front wheel 3 via upper and lower front arms 4a, which in turn are supported at a front portion of the body frame 2 so as to be capable of moving up and down. A cushion unit 4b is located between the body frame 2 and the lower front arms 4a.

The rear wheel suspension device 6 supports each rear wheel 5 via a rear arm 6a, which in turn is supported at a rear portion of the body frame 2 so as to be capable of moving up and down. A cushion unit 6b is located between the rear arm 6a and the body frame 2, in a middle position along the vehicle width direction.

Figure 5:
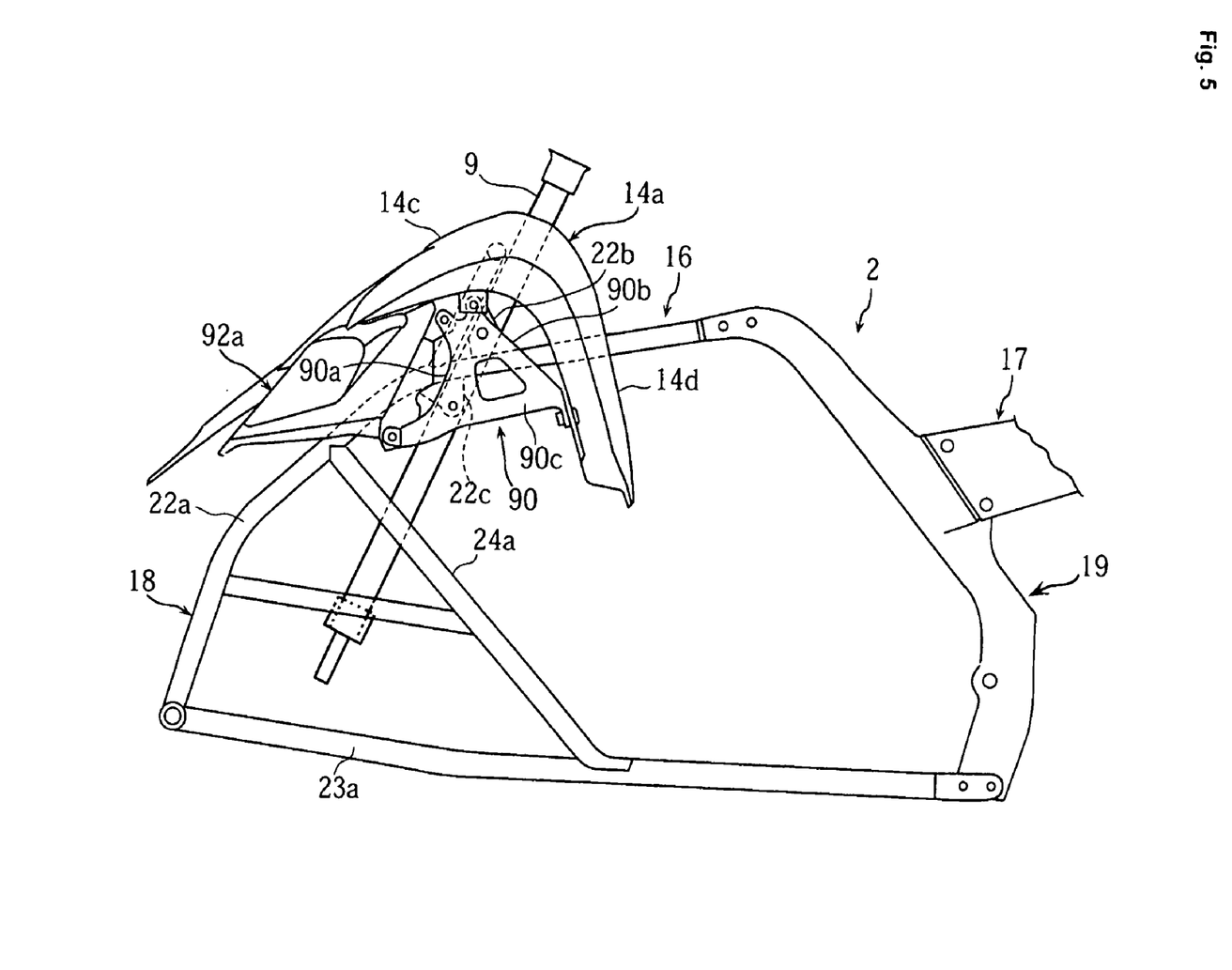
FIG. 5 is a side view of a body frame of the all terrain vehicle shown in FIG. 1.

The body frame 2 preferably includes a main frame 16 which suspends the engine unit 7, and a seat rail 17 which supports the seat 11. When seen from either side, the main frame 16 has a cradle (loop) shape. The main frame 16 is divided into a front subframe 18 and a rear subframe 19, which are linked together using bolts.

The front subframe 18 is preferably made of steel pipes, and includes front upper frame members 22a and front lower frame members 23a on the left and right sides. The front upper frame members 22a are tilted so as to be positioned lower toward the front, and tapered toward the front. The front lower frame members 23a extend substantially horizontally along the front-to-rear direction. The front upper frame members 22a are respectively connected to the front lower frame members 23a via connection members 24a which are arranged in a forwardly leaning posture.

In an upper portion of the left and right front upper frame members 22a of the front subframe 18, left and right brackets 90, 91 are detachably mounted, so as to be located below the left and right front fenders 14a, 14b, respectively. The left bracket 90 supports the left front fender 14a, a left headlight 92a, and a resistor 97 (see FIG. 6). The right bracket 91 supports the right front fender 14b, a right headlight 93a, an ignition coil 94, a regulator 95, and a reverse lever 96 (see FIG. 7).

Figure 6:
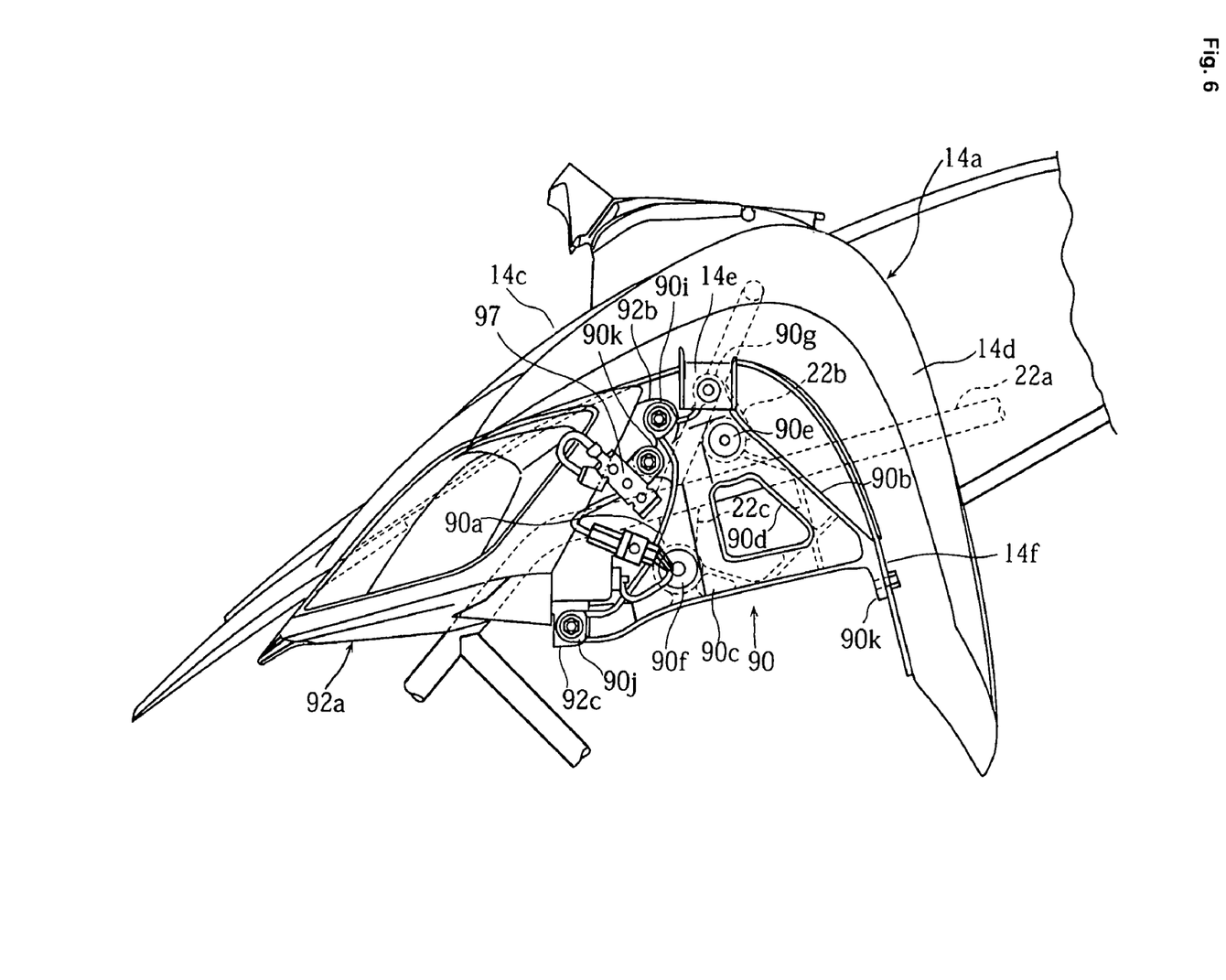
FIG. 6 is a side view showing the vicinity of a left bracket of the vehicle.
Figure 7:
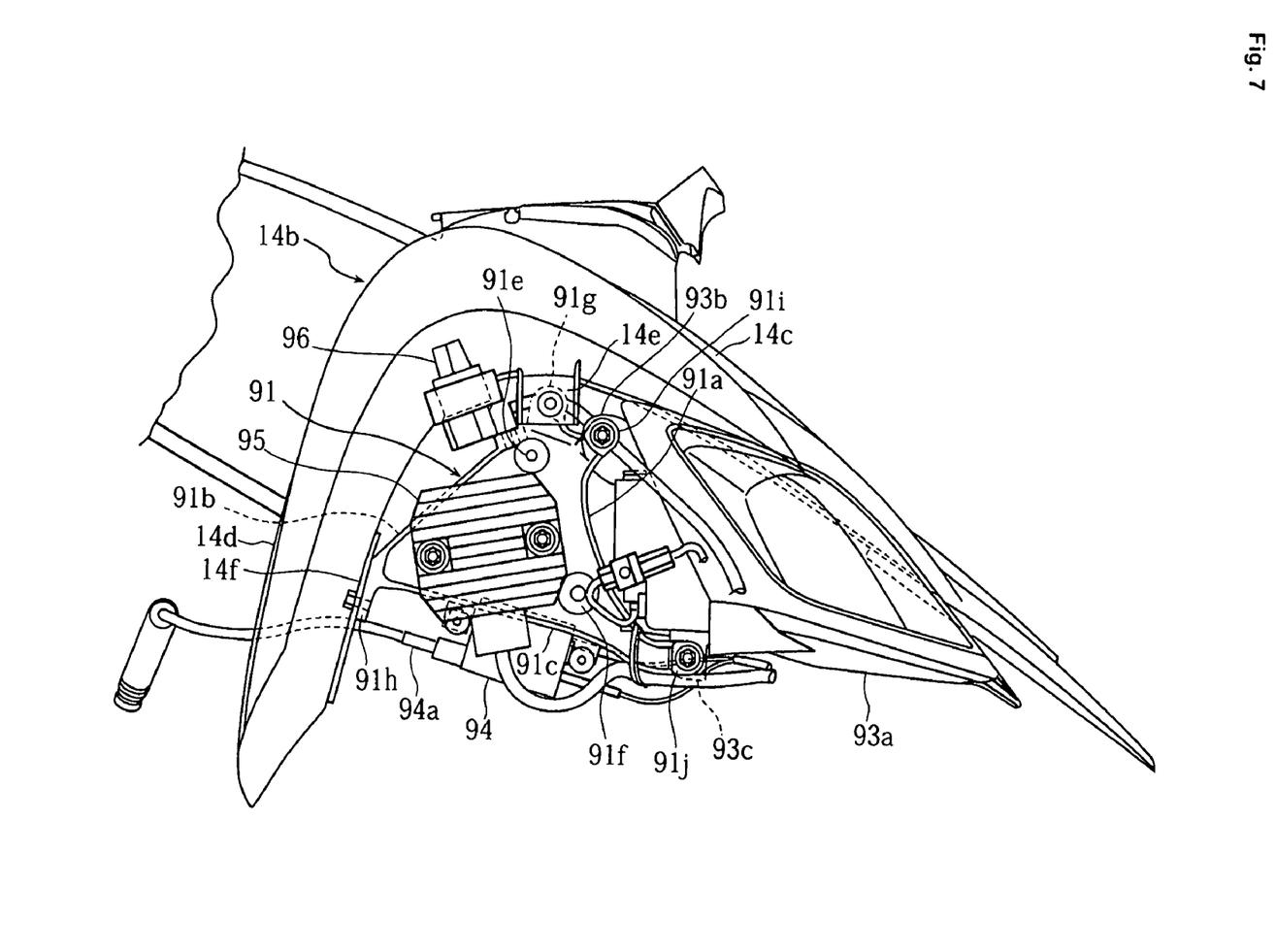
FIG. 7 is a side view showing the vicinity of a right bracket of the vehicle.

The left and right front fenders 14a, 14b are preferably molded from resin. Each front fender 14a, 14b is bent so as to appear substantially L-shaped when viewed from either side of the vehicle, and includes a front side portion 14c extending obliquely forward below and a rear side portion 14d extending obliquely rearward below.

Referring to FIG. 7, the right bracket 91 is preferably made of a cast aluminum material, and has a substantially triangular shape composed of a front oblique side portion 91a, a rear oblique side portion 91b, and a bottom side portion 91c. In a central portion of the right bracket 91 is formed a hollow 91d for reducing the mass of the right bracket 91.

Near the vertex angle portion and near the front base angle portion of the right bracket 91, an upper frame boss section 91e and a lower frame boss section 91f for attachment to the body frame are arranged so as to protrude toward the back surface. The upper and lower frame boss sections 91e, 91f are bolted respectively to attachment brackets 22b, 22c (as best shown in FIG. 5) which are provided on the front upper frame member 22a of the body frame 2. Thus, the right bracket 91 is attached to the right side of the body frame.

An upper fender boss section 91g for allowing a front fender to be attached thereto is provided at an upper end (vertex angle portion) of the right bracket 91. A lower fender boss section 91h is provided at a lower-rear end (rear base angle portion) of the right bracket 91. To the upper fender boss section 91g, an upper attachment bracket 14e, which is integrally formed on the right front fender 14b near the boundary between the front side portion 14c and the rear side portion 14d, is bolted. To the lower fender boss section 91h, a lower attachment boss section 14f, which is integrally formed at a lower end of the rear side portion 14d, is bolted.

At the vertex angle portion and the front base angle portion of the right bracket 91, respectively, upper and lower light boss sections 91i, 91j for allowing a headlight to be attached thereto are integrally formed. To the upper and lower light boss sections 91i, 91j, upper and lower attachment brackets 93b, 93c (which are respectively formed at upper and lower portions of the rear face of the right headlight 93a) are bolted, respectively. The upper and lower light boss sections 91i, 91j are both arranged substantially perpendicularly to the front oblique side portion 91a of the bracket. Note that the lower light boss section 91j is located at a position which is farther away from the front oblique side portion 91a than the upper light boss section 91i. Thus, since the headlight is fixed at positions which are spaced apart not only along the top-to-bottom direction but also along the front-to-rear direction, the fixing is securely and reliably achieved despite the simple shape of the bracket.

Figure 8:
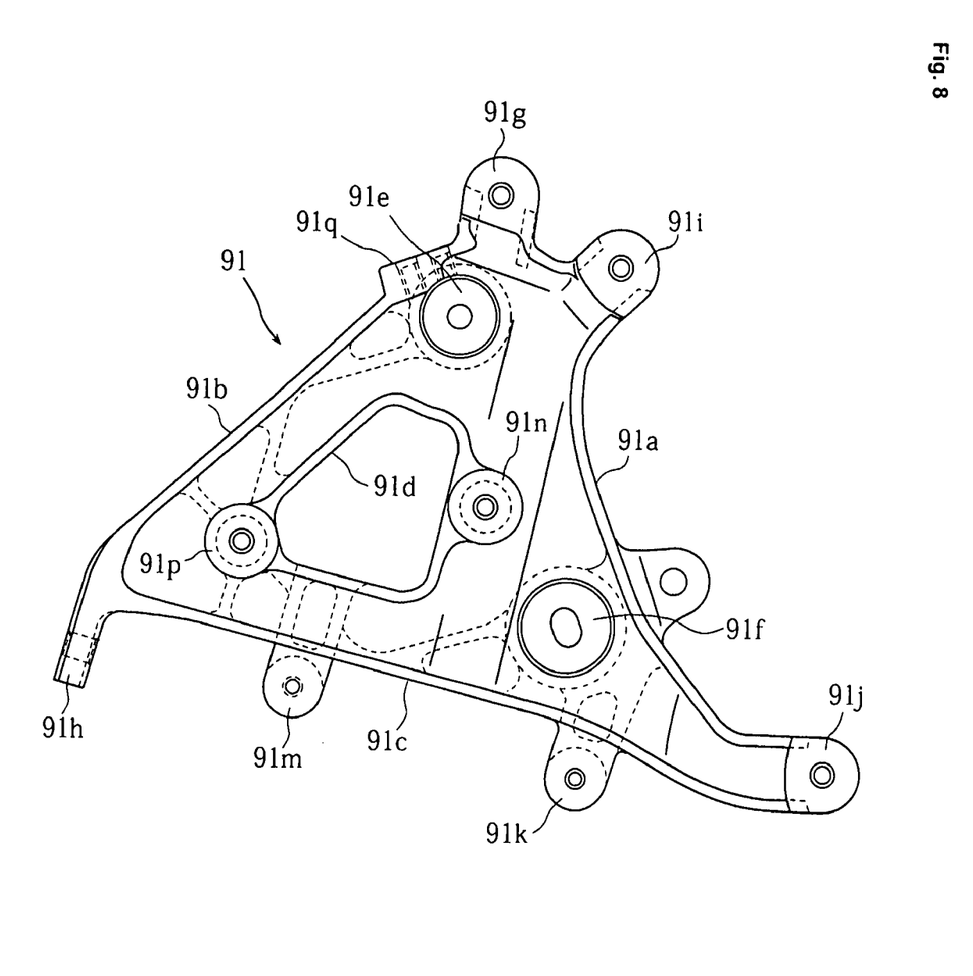
FIG. 8 is a side view of the right bracket.
Figure 9:
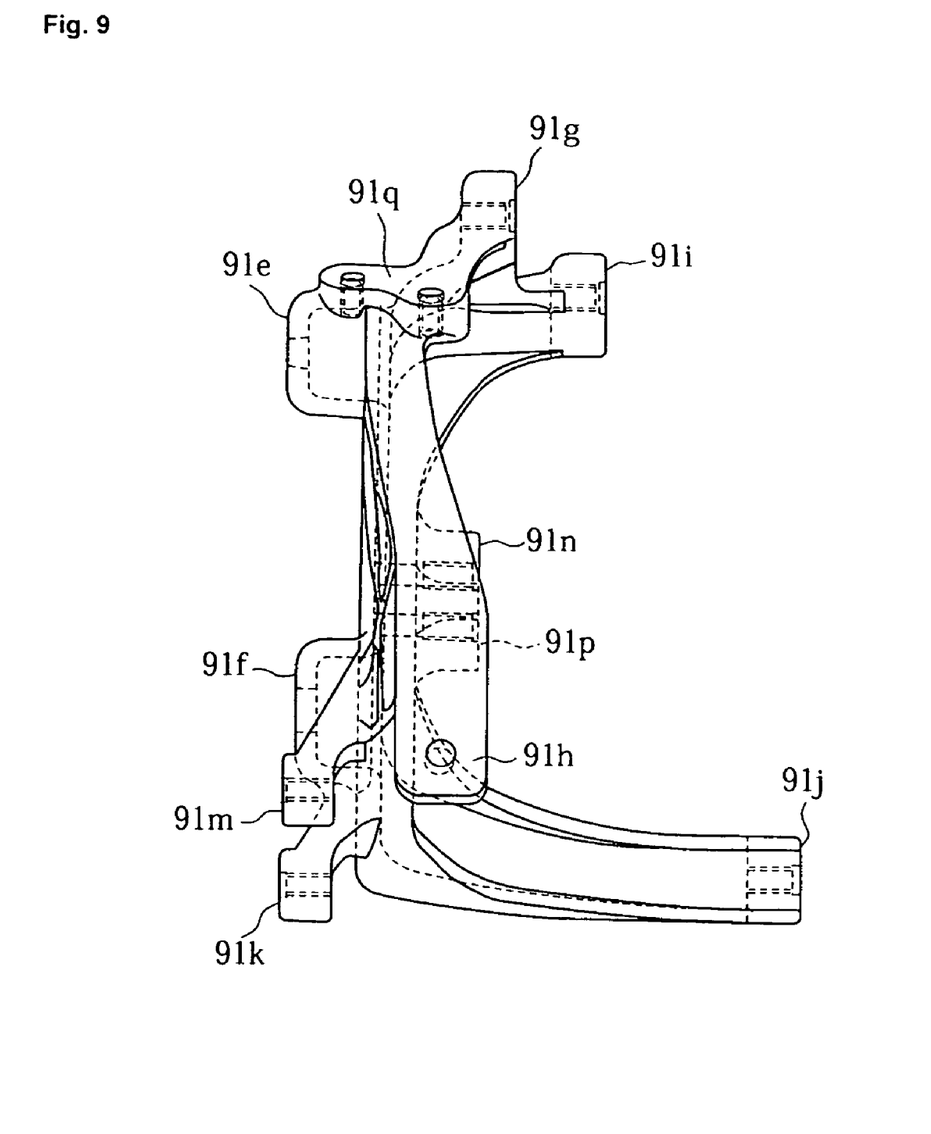
FIG. 9 is a rear view of the right bracket.

Referring to FIG. 8, on the bottom side portion of the right bracket 91, front and rear coil boss sections 91k, 91m for allowing an ignition coil to be attached thereto are formed, so as to protrude obliquely below at the rear surface. To the front and rear coil boss sections 91k, 91m, the ignition coil 94 is attached so as to extend along the front-to-rear direction, such that a secondary side of the ignition coil 94 is located at the rear. A high voltage cord 94a extending from the secondary side of the ignition coil 94 is connected to a spark plug which is located near the rear surface of the rear side portion 14d of the rear fender 14b.

Along the edge of the hollow 91d in the right bracket 91, regulator boss sections 91n, 91p for allowing a regulator to be attached thereto are integrally formed. To the regulator boss sections 91n, 91p, the regulator 95 is disposed so as to be placed on the outer side, along the vehicle width direction, of the bracket 91.

Furthermore, near the vertex angle portion of the right bracket 91, a lever boss section 91q for allowing a reverse lever to be attached thereto is provided. The reverse lever 96 is attached to the lever boss section 91q.

The ignition coil 94, the regulator 95, and the reverse lever 96 are attached to the right bracket 91 in the aforementioned manners. Thus, these elements can be positioned in place via the aforementioned simple structure, without performing any particular processing for the frame for allowing such elements to be attached thereto. Moreover, the right bracket 91 bearing the electrical components such as the ignition coil and the regulator is placed on the outer side (along the vehicle width direction) of the body frame. Therefore, these electrical components are in positions which are exposed to the air and wind during the vehicle movement, and thus are cooled well.

Referring to FIG. 6, the left bracket 90, which is also preferably made of a cast aluminum material similarly to the right bracket 91, has a substantially triangular shape including a front oblique side portion 90a, a rear oblique side portion 90b, and a bottom side portion 90c. A hollow 90d is formed in the left bracket 90.

The left bracket 90 also preferably includes upper and lower frame boss sections 90e, 90f for attachment to the body frame, upper and lower fender boss sections 90g, 90h for allowing a front fender to be attached thereto, and upper and lower light boss sections 90i, 90j for allowing a headlight to be attached thereto, these sections being integrally formed on the left bracket 90 at respectively similar positions to their counterparts on the right bracket 91.

Near an upper end of the front oblique side portion 90a of the left bracket 90, a resistor boss section 90k is provided, to which the resistor 97 is bolted.

In accordance with the all terrain vehicle 1 of the present preferred embodiment, the brackets 90, 91, which are separate elements from the body frame 2, are detachably mounted to the body frame 2, with the headlights 92a, 93a being mounted to the brackets 90, 91, respectively. As a result, by appropriately selecting the shapes of the brackets 90, 91, it becomes possible to provide the headlights 92a, 93a in arbitrary positions, thus increasing the design freedom around each headlight.

Since both the headlights 92a, 93a and the left and right front fenders 14a, 14b are attached to the left and right brackets 90, 91, positioning of the headlights 92a, 93a with respect to the front fenders 14a, 14b, and vice versa, can be well established. In addition, it is unnecessary to form or attach any particular members for affixing the front fenders 14a, 14b, thus making a simpler structure possible.

Furthermore, in a preferred embodiment where the front fenders 14a, 14b each have a bent shape including the front side portion 14c and the rear side portion 14d, the vicinity of the boundary between the front side portion 14c and the rear side portion 14d of the front fender is supported by the upper fender boss section 90g or 91g of the bracket 90 or 91, while the rear side portion 14d is supported by the lower-rear fender boss section 90h or 91h. As a result, without requiring any particular members that are dedicated to the fixation of the front fenders 14a, 14b, the bent front fenders 14a, 14b can be securely supported by the simple-shaped brackets. Since each front fender is secured by a single bracket, positioning is facilitated and well established.

Each bracket 90 or 91 preferably has a generally triangular shape including the front oblique side portion 90*a* or 91*a*, the rear oblique side portion 90*b* or 91*b*, and the bottom side portion 90*c* or 91*c*. Therefore, upper and lower frame boss sections, upper and lower fender boss sections, and upper and lower light boss sections can be formed by utilizing the vicinity of the vertex angle portion of the triangular shape, the vicinity of the front base angle portion, and the vicinity of the rear base angle portion. Thus, a multitude of elements can be surely supported by a single bracket.

Since each bracket is preferably made of a cast aluminum material, its shape can be designed with great freedom, and the aforementioned various boss sections can be easily formed. Increase in the mass of the brackets can be minimized despite the additional parts.

Since the ignition coil 94 is attached to the bottom side portion 91*c* of the right bracket 91 so as to be oriented along the front-to-rear direction, and connected to a spark plug of the engine which is disposed near the rear end of the right front fender 14*b* via the secondary cord 94*a*, the length of the secondary cord 94 can be saved, and there is little voltage drop.

Since the lever 96 for reverse operation is disposed near the vertex angle portion of the right bracket 91, the lever 96 is easily reachable by the driver, thus facilitating the switching operation.

The left and right brackets 90, 91 are attached on the left and right sides of the body frame 2 so as to be on the outer sides of the frame. Therefore, the attachment of the brackets 90, 91 is easy, and there is not much constraint on the shape of the bracket due to the shape of the frame, whereby a high design freedom with respect to the shape of the brackets 90, 91 is provided. Furthermore, since the brackets 90, 91 are disposed on the outer sides along the vehicle width direction, the elements mounted to the bracket are exposed to the air and wind during vehicle movement, thus improving the cooling of the elements mounted to the brackets. In particular, during the vehicle movement, the regulator 95 which is mounted to the right bracket 91 (on the outer side along the vehicle width direction) effectively receives air and wind which are guided to the regulator 95 by the action of the front side portion 14*c* of the right front fender 14*b*. Thus, the regulator 95 can be surely cooled.

Although the above-described preferred embodiment illustrates an example where an ignition coil, a regulator, a reverse lever, and a resistor are mounted to the brackets, it will be appreciated that any other elements may also be mounted to the brackets.

Although the above-described preferred embodiment illustrates an example where each bracket is made of a cast aluminum material and has a substantially triangular shape, it will be appreciated that the material, shape, and production method of the brackets are not limited to such.

Although the above-described preferred embodiment illustrates an example where each front fender is formed in a bent shape including a front side portion and a rear side portion, the front fender shape is not limited to such.

While the invention has been described in detail, the foregoing description is in all aspects illustrative and not restrictive. It is understood that numerous other modifications and variations can be devised without departing from the scope of the invention.

What is claimed is:

1. An all terrain vehicle comprising:
    right and left front wheels respectively disposed on front right and left sides of a body frame;
    right and left front fenders respectively disposed above the right and left front wheels;
    right and left headlights respectively disposed in front of the right and left front fenders, each of the right and left headlights including at least one attachment bracket; and
    right and left brackets detachably mounted to the body frame so as to be located below the right and left front fenders, respectively; wherein
    the right and left headlights are mounted to the right and left brackets via the at least one attachment bracket, respectively, and the right and left headlights are not attached to any other structure of the vehicle other than the right and left brackets via the at least one attachment bracket, respectively;
    the right and left front fenders are attached to the right and left brackets, respectively;
    each of the right and left front fenders has a bent shape having a front side portion extending obliquely forward below and a rear side portion extending obliquely rearward below; and
    each of the right and left brackets includes frame boss sections to be fixed to the body frame, an upper fender boss section arranged to support an area near a boundary between the front side portion and the rear side portion of the respective front fender, a rear fender boss section arranged to support the rear side portion, and light boss sections arranged to support the respective headlight.

2. The all terrain vehicle according to claim 1, wherein each of the right and left bracket has a generally triangular shape having a front oblique side portion, a rear oblique side portion, and a bottom side portion, and
    the frame boss sections are respectively located near a vertex angle portion of the bracket and near a front base angle portion of the bracket, the upper fender boss section and the rear fender boss section are respectively located near the vertex angle portion of the bracket and near a rear base angle portion of the bracket, and the light boss sections are respectively located near the vertex angle portion of the bracket and near the front base angle portion of the bracket.

3. The all terrain vehicle according to claim 2, wherein an ignition coil is mounted to the bottom side portion of one of the right and left brackets so that a secondary coil of the ignition coil is oriented toward the rear of the vehicle, the ignition coil being connected to a spark plug of an engine which is disposed near a rear end of each of the right and left front fenders via a secondary cord extending from the secondary coil.

4. The all terrain vehicle according to claim 2, wherein a reverse switch is provided near the vertex angle portion of one of the right and left brackets.

5. The all terrain vehicle according to claim 2, wherein a regulator is mounted to an outer side, along a vehicle width direction, of one of the right and left brackets.

6. The all terrain vehicle according to claim 1, wherein at least one of the right and left brackets is attached to a side of the body frame so as to be on an outer side of the frame.

7. The all terrain vehicle according to claim 1, wherein the right and left front fenders are directly attached to the right and left brackets, respectively.

8. The all terrain vehicle according to claim 1, wherein the right and left fenders are not attached to the right and left headlights, respectively.

* * * * *